United States Patent [19]

Lee et al.

[11] Patent Number: 4,955,563

[45] Date of Patent: Sep. 11, 1990

[54] APPARATUS AND METHOD FOR CONTROLLED SIMULTANEOUS OPENING OF CLUSTERED PARACHUTES

[75] Inventors: Calvin K. Lee, Needham; James E. Sadeck, East Freetown, both of Mass.

[73] Assignee: The United States of America as represented by the Secretary of the Army, Washington, D.C.

[21] Appl. No.: 401,192

[22] Filed: Aug. 25, 1989

[51] Int. Cl.⁵ .................................. B64D 17/36
[52] U.S. Cl. ....................... 244/152; 244/149
[58] Field of Search ............. 244/149, 152, 148

[56] References Cited

U.S. PATENT DOCUMENTS

| | | | |
|---|---|---|---|
| 3,170,660 | 2/1965 | Kehlet | 244/152 |
| 3,315,921 | 4/1967 | Riley et al. | 244/152 |
| 3,423,054 | 1/1969 | Stencel | 244/149 |
| 3,434,680 | 3/1969 | Ferguson | 244/152 |
| 3,756,547 | 9/1973 | Snyder et al. | 244/152 |
| 4,752,050 | 6/1988 | Johnson | 244/152 |

FOREIGN PATENT DOCUMENTS 1410563  9/1964  France ................. 244/152

*Primary Examiner*—Charles T. Jordan
*Assistant Examiner*—Rochelle Lieberman
*Attorney, Agent, or Firm*—Richard J. Donahue; Lawrence E. Labadini

[57] ABSTRACT

A parachute assembly and method for the controlled airdrop of a payload is disclosed. The parachute assembly includes a cluster of parachutes and a control means. Each parachute in the cluster includes a canopy, a plurality of reefing rings attached to the skirt portion of the canopy and a plurality of suspension lines that are attached to the skirt portion at their one end and attachable to a payload at their other end. The control means comprises a common member disposed between and intermediate to each parachute, a plurality of control lines that are threaded through a plurality of the reefing rings on confronting skirt portions of each of two parachutes, and at least one control loop for each control line, which control loop is breakable under tension forces generated at the skirt portion during canopy opening. The method for controlling canopy release and opening of clustered parachutes comprises releasing the clustered parachutes from a single deployment bag. Each control loop breaks substantially simultaneously with all other control loops during opening.

8 Claims, 5 Drawing Sheets

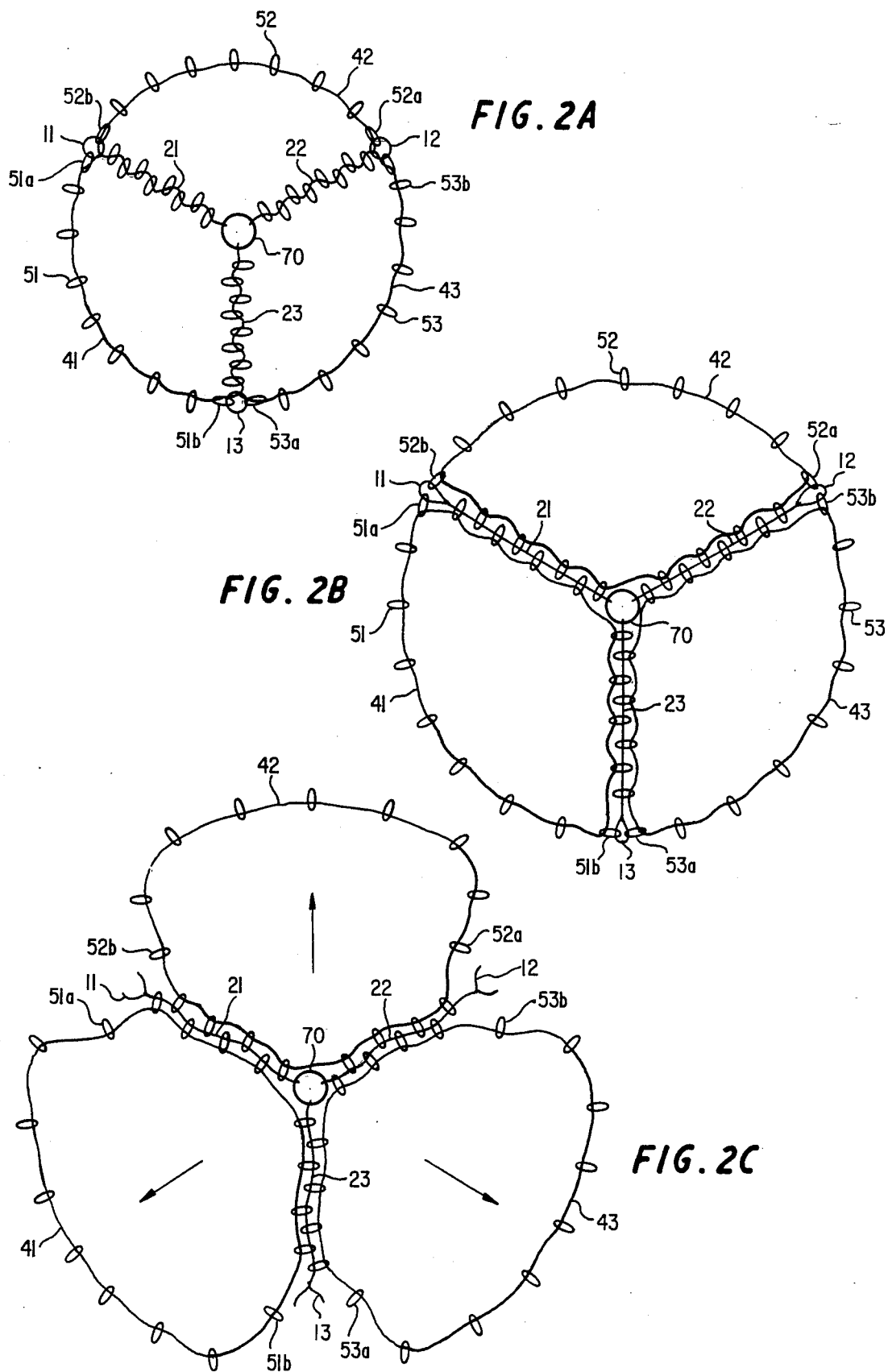

APPARATUS AND METHOD FOR CONTROLLED SIMULTANEOUS OPENING OF CLUSTERED PARACHUTES

The invention described herein may be manufactured, used and licensed by or for the Government for Governmental purposes without the payment to us of any royalty thereon.

FIELD OF INVENTION

The invention is directed to an improved method for controlled release and simultaneous opening of the canopies of two or more clustered parachutes. More particularly, this invention is directed to a novel means for substantially improved opening of clustered parachutes. Most particularly, this invention is directed to a method and apparatus for simultaneous opening of a plurality of parachutes forming a clustered parachute system so as to avoid overloading of the lines or the canopy fabric of any individual parachutes in the cluster.

BACKGROUND OF THE INVENTION

Clustered parachutes, which are not new in the art, offer several advantages over a single large parachute. One, clustered parachutes provide a shorter opening time and distance. Two, clustered parachutes are easier to fabricate and recover.

The major difficulty with clustered parachutes is that the parachutes in the cluster generally do not open simultaneously. A canopy (or some of the canopies) in a cluster will often inflate more rapidly than the other canopies in the cluster, thereby causing structural overloads on the early opening canopy (or canopies), and aerodynamic interference, which result in inflation difficulty in the late opening canopy (or canopies) and excessive filling times for the total cluster.

One method of preventing the above mentioned problems is to design a clustered parachute system wherein each individual parachute could withstand the entire opening force from the payload. Another method of preventing the above mentioned problems is to include additional or backup parachutes in the cluster to assure safe recovery of the payload. Both methods result in heavy, bulky, and expensive clustered parachute systems.

A better technique for avoiding structural overloads is to design clustered parachutes with canopies that will open, and inflate to the fully open position simultaneously. Even distribution of the opening force among all the parachutes in a cluster provides improved inflation stability and load control. This eliminates overloading and structural damage of the parachutes.

In view of the importance of uniform opening of clustered parachutes, others have developed means for controlling opening of canopies of clustered parachutes during descent.

Stencil teaches simultaneous opening of the canopies of clustered parachutes in U.S. Pat. No. 3,423,054. The Stencil apparatus includes a plurality of canopies which open when an explosive cartridge and its associated firing line-operated activator is activated. When the cartridges are ignited, the combustion gases drive pistons which accelerate projectiles radially outwardly. The accelerated projectiles are connected to the skirt portion of a canopy.

Pinnell teaches simultaneous opening of canopies of clustered parachutes in U.S. Pat. No. 4,780,970. The Pinnell apparatus includes a triangularly-shaped web, located centrally between the parachutes in the cluster, to provide control of the parachute skirts during deployment. Some of the parachute reefing rings of each parachute are held together by the web assembly to limit the opening of the parachute skirt. Pinnell teaches the use of several closed loop reefing lines disposed within a cutter.

Johnson teaches simultaneous opening of canopies of clustered parachutes in U.S. Pat. No. 4,752,050. The Johnson apparatus includes a single multi-line cutter connected to each parachute in a cluster by a separate short tether line. Johnson also teaches the use of several closed loop reefing lines that are threaded through the cutter.

While these earlier apparatus provide means for effecting the simultaneous opening of canopies in a clustered parachute system, the present invention provides an improved means which requires a minimal amount of added equipment, lacks the need for reefing line cutters, is substantially easier to pack than the prior apparatus, and, most importantly, yields reliable and substantially improved cluster opening.

SUMMARY OF THE INVENTION

The present invention is directed to a novel apparatus and method for controlling the canopy release and opening of clustered parachutes.

The apparatus includes a plurality of parachutes, each having a canopy with reefing rings attached to the canopy skirt. Several suspension lines which are attached at one of their ends to the canopy skirt support the payload, to which they are attachable at their other ends.

The apparatus further includes a control means that is common to the canopy of each parachute of the plurality of parachutes. The control means forces each canopy in a cluster of parachutes to open, separate, and to inflate to the fully open position substantially simultaneously.

The control means includes a common member disposed between the parachutes, a series of control lines attached to the common member, and at least one control loop attached to each of the control lines.

The control lines are threaded through a plurality of reefing rings on the separate canopy skirts, respectively. The control loops are frangible lines that are threaded (looped) through at least two reefing rings on each of two adjacent canopy skirts, respectively, at locations remote from said common member.

The method for controlling canopy release and opening of clustered parachutes includes deploying the cluster from a single deployment bag and inflating canopies as though they were one large canopy. The control loops break under the tension developed by the opening force of the canopy skirts, which causes the canopy of each parachute to open, and inflate to the fully open position substantially simultaneously with each other parachute in the cluster.

DESCRIPTION OF THE DRAWINGS

FIGS. 2A, 2B and 2C are upwardly directed views of the embodiment of the invention shown in FIG. 1, during its initial deployment stage through its final deployment stage, showing in particular the initial, intermediate stressed, and broken stages of the control line/loop arrangement;

DETAILED DESCRIPTION

Figure 1:
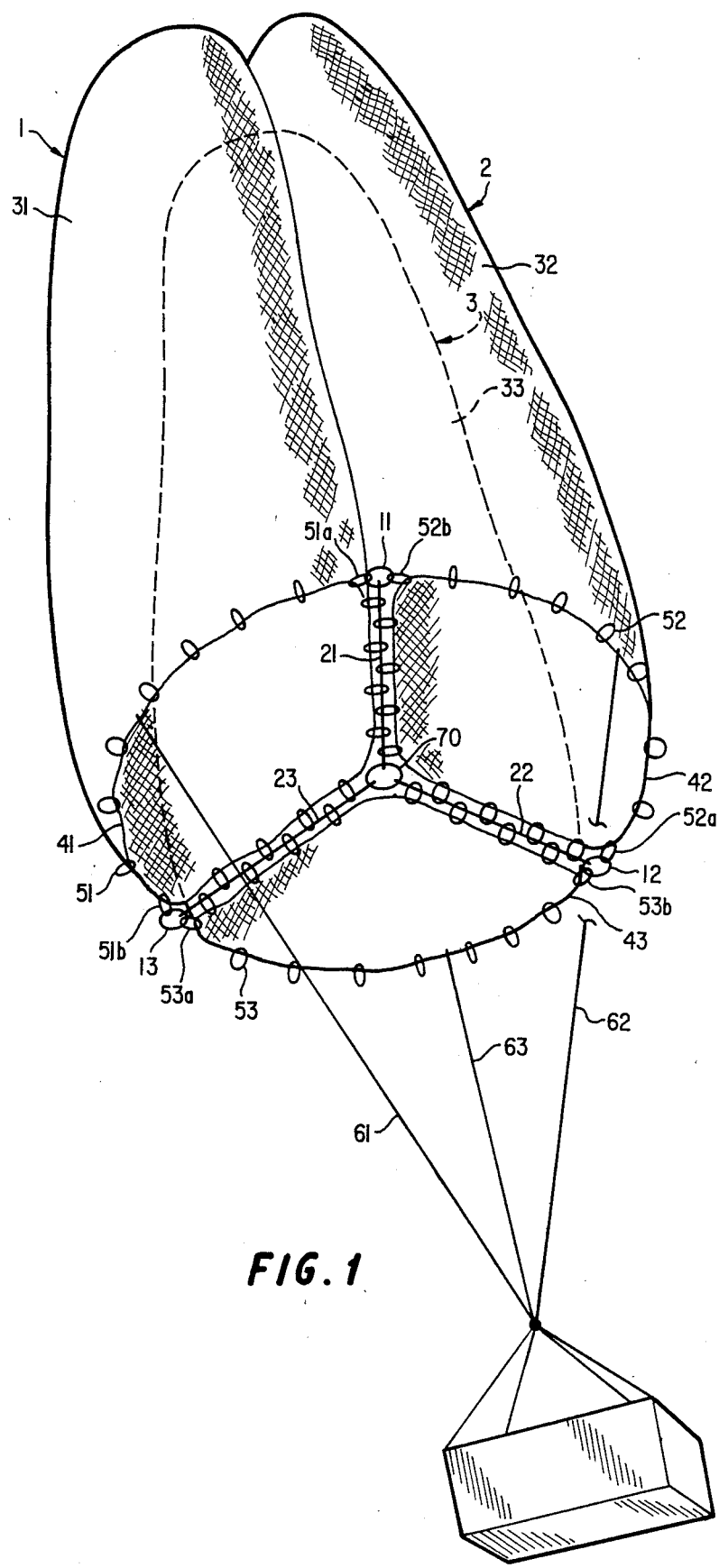
FIG. 1 is a perspective view, partially in schematic form, illustrating one preferred embodiment of the invention during its initial deployment stage, before the control loops have been broken.

With reference to FIG. 1, there is shown a perspective view, partially in schematic form, of a parachute cluster attached to a load, in accordance with one preferred embodiment of the invention, while the parachute cluster is in the initial stage of deployment. Deployment as used herein means in-flight use of a parachute cluster. As shown in FIG. 1, this embodiment includes three parachutes, as identified by the reference numerals 2 and 3, respectively. For illustrative purposes, the parachutes 1, 2 and 3, are, but need not be, generally identical in a cluster.

Each of the parachutes has a canopy such as 31 for parachute 1, 32 for parachute 2, and 33 for parachute 3. As a matter of preference, each canopy may be of the gore type, although it need not be and is not shown as such in the drawings.

Each canopy has a skirt portion shown at 41 for canopy 31, 42 for canopy 32 and 43 for canopy 33. The skirt portion is adjacent the peripheral edge of a canopy.

Each skirt portion 41, 42 and 43 has a plurality of reefing rings that are securely attached to it at evenly spaced intervals along its periphery. One such reefing ring is shown at 51 for canopy 31, 52 for canopy 32 and 53 for canopy 33. Additionally, in FIG. 1, suspension lines are attached at one end to a canopy skirt portion and are attached at the other end to the payload. For illustrative simplicity reasons, only suspension lines 61, 62 and 63 which are shown attached to skirt portions 41, 42 and 43, respectively, are shown in FIG. 1.

The control means is common to each canopy 31, 32 and 33 of each parachute 1, 2 and 3 for releasably connecting each of the parachutes 1, 2 and 3 to each other thereby forming an overall circular skirt shape from three canopies. The control means includes a common member 70 shown in FIGS. 2A, 2B and 2C as a ring 70 that is positioned at the center of the cluster (parachutes 1, 2 and 3), and in generally the same plane as the canopy skirt portions 41, 42 and 43. The ring 70 should be larger than the reefing rings to prevent it from being pulled through the reefing rings. The control lines 21, 22 and 23 are securely attached at equidistant points of attachment to the ring 70 so as to permit their being threaded through a plurality of reefing rings on each two adjacent skirt portions as described below.

As shown in FIG. 1, a control line 21 (intermediate parachutes 1 and 2) is threaded through reefing rings 51 that are securely attached to the skirt portion 41 and is threaded through other, nearby reefing rings 52 which are securely attached to the skirt portion 42.

A control line 22 (intermediate parachutes 2 and 3) is threaded through reefing rings 52 that are securely attached to the skirt portion 42 and is threaded through other nearby reefing rings 53 that are securely attached to the skirt portion 43.

Likewise, a control line 23 (intermediate parachutes 1 and 3) is threaded through reefing rings 51 which are securely attached to the skirt portion 41 and is threaded through other nearby reefing rings 53 that are securely attached to the skirt portion 43.

Attached to the end of control lines 21, 22 and 23 remote from the end that is attached to the ring 70 are control loops 11, 12 and 13, respectively. Thus the control loop 11 is attached to the end of the control line 21, and is threaded through at least one reefing ring 51 that is attached to skirt portion 41 and is threaded through at least one reefing ring 52 that is attached to the skirt portion 42. The control loop 12 is attached to the end of the reefing line 22 and is threaded through at least one reefing ring 52 that is attached to the skirt portion 42 and is threaded through at least one reefing ring 53 that is attached to the skirt portion 43. The control loop 13 is attached to the end of the control line 23 and is threaded through at least one reefing ring 53 and is attached to the skirt portion 43 and is threaded through at least one reefing ring 51 that is attached to the skirt portion 41.

Preferably, the control loops 11, 12 and 13 are made of frangible lines that are designed to break at a desired force (time) during deployment. A suitable control line may be made into a secured loop by tying its ends together. Optionally, several control loops may be secured to one control line, along its length, for a sequential release as each loop breaks inwardly toward ring 70 under stress. This permits a gradual release and opening of the canopies. The loops may be graded in strength, if desired, to time the rate of release.

In accordance with the description of the preferred embodiment shown in FIGS. 1 and 2A, 2B and 2C, each of the control loops 11, 12 and 13 is designed to break simultaneously during opening of the parachute cluster.

With reference to FIG. 2A, 2B and 2C there is shown an upwardly directed view of a three-parachute-cluster system from its connected state in FIG. 2A during initial opening, to its releasing state in FIG. 2C during a later stage of opening.

As shown in FIG. 2A, the parachutes in the cluster, i.e. the three parachutes 1, 2 and 3, are releasably connected and partially reefed with control lines 21, 22 and 23. As the cluster descends with its payload, the skirt portions 41, 42 and 43 of the parachutes 1, 2 and 3 form an overall circular skirt shape as though the three canopies were one. Air flows from the skirts of the canopies to the apexes of the canopies. As the apexes become filled with air and create a drag force, the skirt portions 41, 42 and 43 are forced open. As shown in FIG. 2B, any slack in the control lines 21, 22 and 23 is lost due to this opening force. Concurrently, reefing rings 51a and 52b, 52a and 53b, 51b and 53a pull on the control loops 11, 12 and 13, respectively. At a certain stage during opening, as shown in FIG. 2C, the control loops 11, 12 and 13 break, alloWing the canopies 31, 32 and 33 of the parachutes 1, 2 and 3 to open, separate, and to inflate to their fully open positions substantially simultaneously.

While a three-parachute-cluster is shown as one preferred embodiment, other embodiments are contemplated such as two-parachute cluster, four-parachute cluster and the like.

EXAMPLES OF THE USE OF THE INVENTION

To maintain symmetry during opening, the same amount of reefing, control lines of uniform lengths, and control loops having the same break strengths are used for the parachutes in a cluster. These variables depend on the type of parachute used, the number of parachutes in the cluster, and the deployment conditions. By choosing the optimum combination of these variables, the opening of the cluster should be well controlled and more uniform. The following examples demonstrate the control canopy release method of the present invention

EXAMPLE 1

Two-Parachute Cluster

The improved method for control canopy release for clustered parachutes of the present invention was tested in clusters of two G12 parachutes. G12 parachutes are 64-foot-diameter, flat-circular, solid cloth, standard Air Force cargo parachutes. A large deployment bag was made up by modifying and connecting two G11 parachute deployment bags (same type as G12, but larger with 100-foot-diameter) for the 2-G12 cluster. Standard Army airdrop rigging procedures for G12 parachutes were used for the cluster tests; these included a 2,200-lb design payload for each G12 (4,400 lb for the cluster) and a 15-foot-diameter ring slot drogue chute for payload extraction at 130-knot C130 aircraft speed The only difference in procedure from the standard packing procedure was that the G12's were packed by using the control canopy release method and were packed together in the one large deployment bag. For comparison purposes, some standard 2-G12 cluster tests, i.e., each G12 packed in its own deployment bag, were also conducted. In all the tests, a load cell in the riser extension of each parachute and a telemetry system in the payload were used to measure the opening force, $F_0$, as a function of time, t. A comparison of the two measured opening forces in the cluster shows the degree of simultaneity of the cluster openings.

Various values of the control variables were attempted for the G12 clusters. The variables that showed the best performance were the following:

| Clusters | Control Line Length, ft. | Percent of Reefing Rings Threaded by One Control Line | Breaking Strength of Control Loop, lb |
|---|---|---|---|
| 2-G12 | 10 | 25 | 100 |

High speed movies of the tests showed that the two G12s were held together during opening. The air space between the two parachutes was eliminated and they were inflated as though they were one parachute. When the two parachutes were almost fully inflated, the opening forces at their skirts broke the two control loops and separated the canopies to complete the opening. The simultaneity of the opening is quantitively shown by the measured opening forces in FIG. 3a. It is seen that shortly after canopy snatching at about 2.5 seconds, the two opening forces rose together, indicating controlled and simultaneous opening of the canopies. The simultaneous opening continued until the two control loops broke. At this instant, the two G12s were almost fully opened; the "non-controlled" opening occurring thereafter had lower opening forces and was not critical.

Figure 3A:
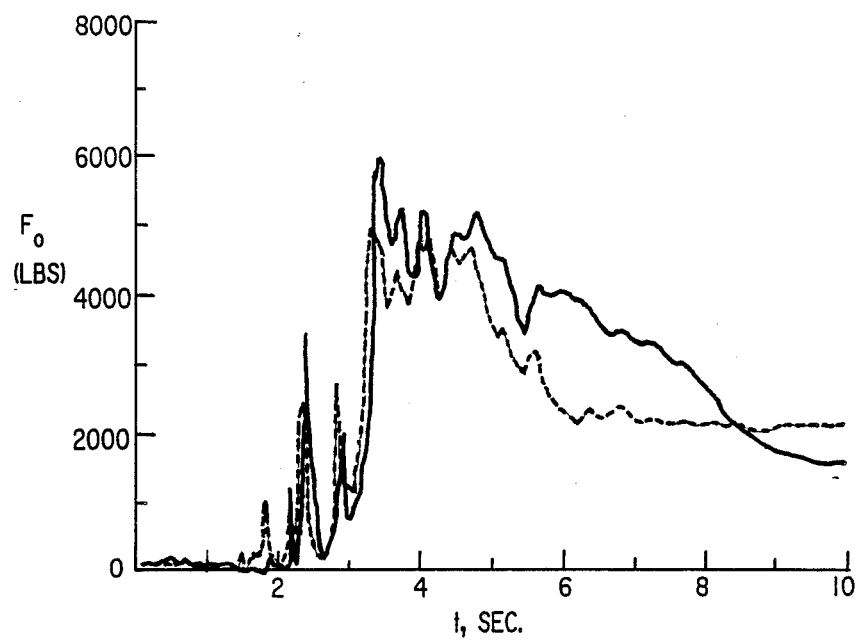
FIGS. 3A and 3B are plots of the opening forces versus time for each parachute canopy in a two-cluster-parachute system of the present invention and for a conventional two-cluster-parachute system, respectively.
Figure 3B:
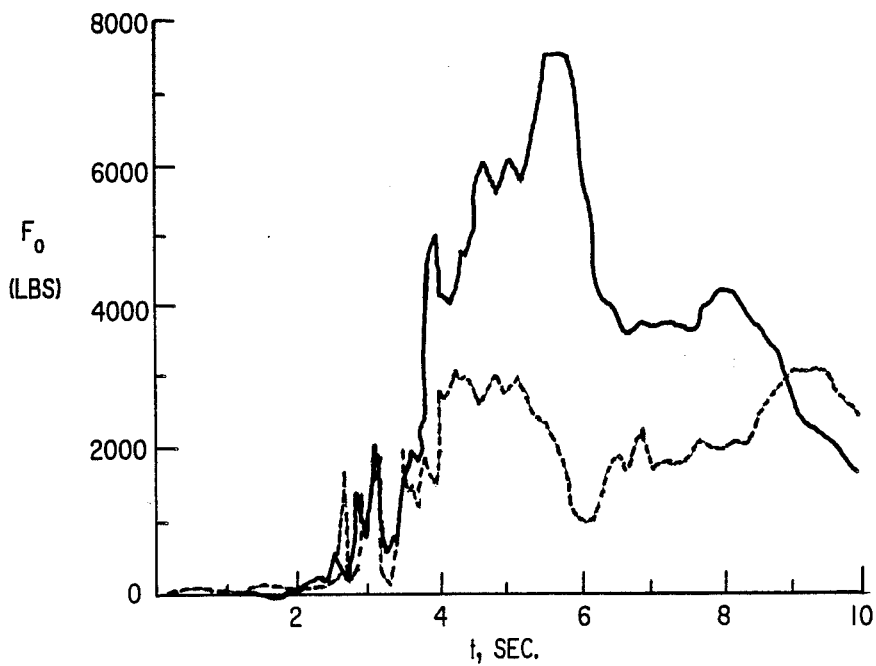

For comparison purposes, FIG. 3b shows the opening forces of a 2-G12 cluster using standard packing procedures. The opening was highly uncontrolled. Immediately after canopy snatching, one G12 opened much more quickly than the other one. This lead- and lag-opening persisted, resulting in the peak opening force of the lead-opening G12 at 250% of that of the lag-opening G12; whereas the peak opening forces in FIG. 3a are practically the same. A comparison of FIG. 3a with FIG. 3b shows a significant improvement in the opening by the control canopy release method of this invention.

EXAMPLE 2

Three Parachute Cluster

The present invention was extended to clusters of three G12 parachutes. The 3-G12 cluster was packed in the same large deployment bag used for the 2-G12 cluster. A standard payload weight of 6,600 lbs was used for the cluster. Opening tests were conducted at 130-knot deployment speed from a C130 aircraft.

The tests showed that the three parachutes were held together from snatching to almost full inflation. The air space between adjacent parachutes was eliminated and the three canopies moved and opened together as though they were one large parachute. Because of the large skirt area covered by the three canopies and the curvilinear trajectory motion of the cluster, it was extremely difficult to achieve a perfect circular overall skirt shape (a similar problem for a single large parachute). However, the overall skirt shape of the cluster was a significant improvement over the typical uncontrolled irregular skirt shape of each canopy observed in a standard cluster.

A comparison of the opening forces between a 3-G12 cluster using the control canopy release method and a standard 3-G12 cluster is shown in FIG. 4. The opening of the standard 3-G12 cluster was highly uncontrolled in that one parachute was subject to the majority of the total opening force, whereas the use of the present invention resulted in much more even distribution of the total opening force.

Figure 4A:
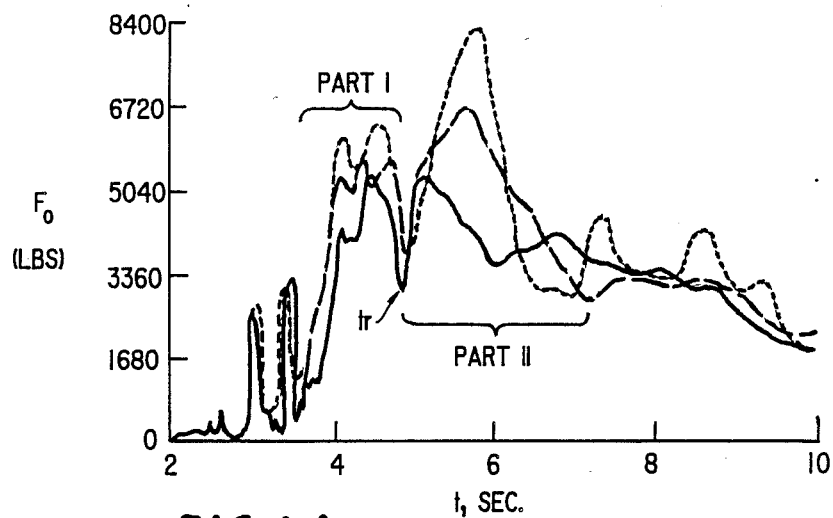
FIGS. 4A and 4B are plots of the opening forces versus time for each parachute canopy in a three-cluster-parachute system of the present invention and for a conventional three-cluster-parachute system, respectively.

Close examination of FIG. 4A reveals that the overall cluster opening behavior resembles that of a single parachute with one-stage reefing. Part I of the opening force profile in FIG. 4A corresponds to the time period when the three G12s were connected and inflated together (like a reefed single parachute). Time $t_r$ is the time when the three control loops broke and the three canopies began to separate. Part II corresponds to the second and final stage of the cluster opening when the canopies were no longer connected (like a disreefed parachute). Based on the numerous 3-G12 cluster opening tests, part I of the opening (when the parachutes are held together) is consistently uniform; for the test in FIG. 4A, the peak opening force distribution is 36%:33%:31%. The initial opening force rise in part II is also uniform. But when the three parachutes are separated and inflate in an "uncontrolled" manner in the latter part of part II, the opening is not as uniform as that in part I.

Figure 4B:
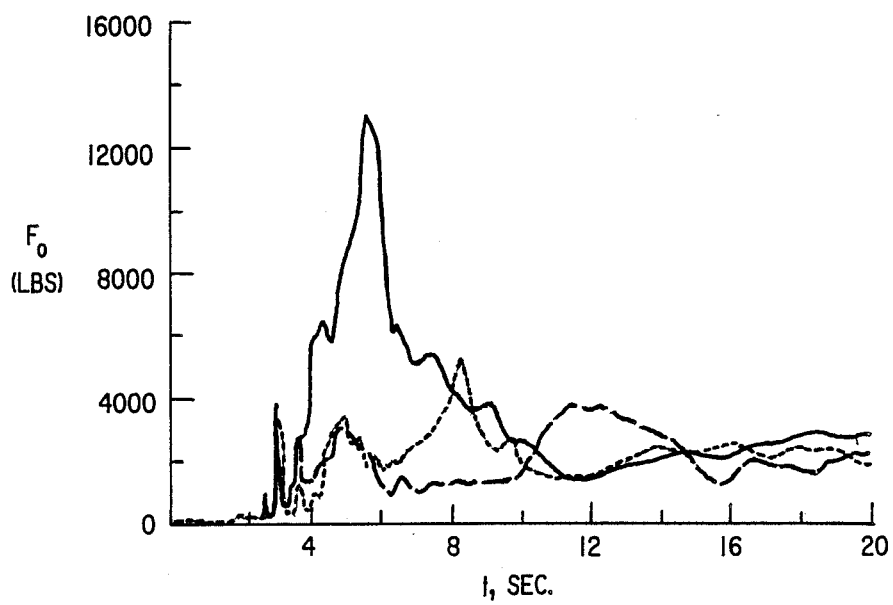

Part I, the initial inflation phase of the cluster, is an important and critical part of the opening because it sets the stage for the subsequent opening in part II. If part I is not satisfactory, such as that shown in FIG. 4B, uniform opening of the cluster as a whole will be highly unlikely as indicated in FIG. 4B. Although the peak opening force distribution of part II in FIG. 4A is not as good as that of part I, the overall opening force distribution in a cluster such as that in FIG. 4A should be satisfactory in terms of maintaining the structural integrity of the cluster. On the other hand, the opening force distribution in FIG. 4B is highly susceptible to canopy structural damage.

The control canopy release method was also tested with a smaller 3-C9 parachute (28-foot-diameter, flat circular, solid cloth, standard Air Force personnel parachute) clusters. Three C9 parachutes were packed together by using one G12 deployment bag. Opening tests were conducted with a 500 lb payload at 130-knot deployment speed from a C130 aircraft.

Figure 5:
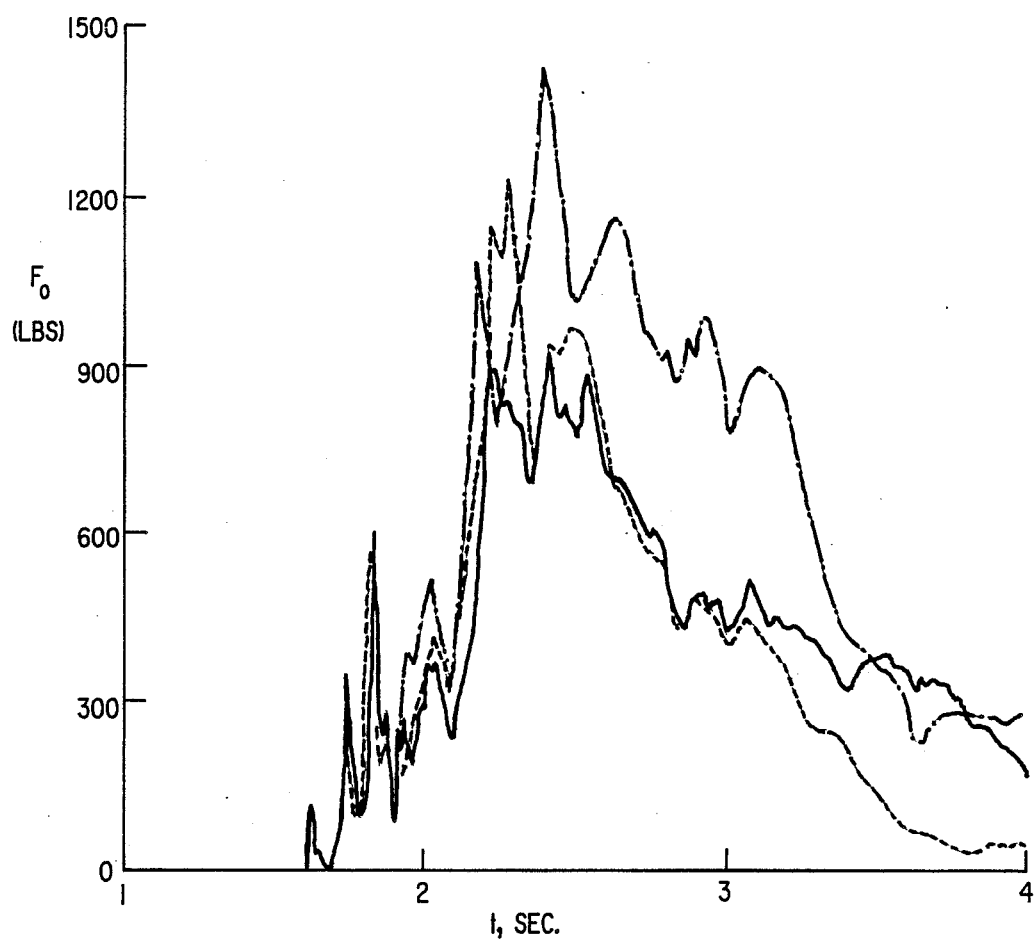
FIG. 5 is a plot of the opening force versus time for each parachute canopy in a different three-cluster-parachute system of the present invention.

The measured opening forces of the three C9 parachutes shown in FIG. 5 indicates that the overall cluster opening was satisfactory. In particular, like the 3-G12 cluster, the initial rise of the three opening forces (the initial opening) was simultaneous and the first peak opening force distribution was 37%:34%:29%. Thereafter, when the three parachutes were separated, the peak opening forces were moderately different. However, the overall opening force distribution was quite satisfactory. It appears that the current control canopy release method should also be applicable to personnel clustered parachutes for reliable opening and low altitude deployment.

CONCLUSION

The method of the present invention, for improved opening of clustered parachutes, includes inflating the parachutes in a cluster as though they were one large parachute. This is accomplished by partial reefing of the parachutes and connecting them together during most of the opening, and then separating them to complete the opening. This method has been successfully tested with 2-G12, 3-G12, and 3-C9 parachute clusters. Canopy opening was significantly improved when compared to the opening of the canopies of clustered parachutes without using this method.

In particular, the current method consistently provided substantially simultaneous opening of the parachutes during initial cluster inflation, which is a critical time period for clusters. This establishes that the concept of connecting the parachutes together to inflate them together as one parachute does improve cluster opening.

The current method is flexible in that the amount of reefing of each parachute, the length of connection along the skirts between adjacent parachutes, and the breaking strength of control loops can be varied to satisfy the requirements for simultaneous opening of clusters of different parachutes. Therefore, although only C9 and G12 parachute clusters have been presented, the invention is applicable to various sizes and types of clustered parachutes.

An important outcome of this method is the possibility of significantly reducing the required strength of parachutes in clusters. Due to the generally uneven opening of parachutes in a standard cluster, parachutes are now normally over-designed to absorb the random high opening loads. Since uniform opening and evenly distributed opening loads are ensured by the control canopy release method, less expensive and lighter canopy fabric can be used for the parachutes.

The foregoing is considered as illustrative only of the principles of the invention. Further, since numerous modifications and changes will readily occur to those skilled in the art, it is not desired to limit the invention to the exact construction and operation shown and described and accordingly all suitable modifications, and equivalents which may be resorted to fall within the scope of the invention.

What is claimed is:

1. A parachute assembly for the controlled airdrop of a payload, comprising:
   a. a cluster of parachutes, each of said parachutes comprising;
      (i) a canopy with a skirt portion located at the peripheral edge of said canopy,
      (ii) a plurality of reefing control rings that are attached at points of attachment that are substantially equidistant from each other on said skirt portion, and
      (iii) a plurality of suspension lines that are each attached to said skirt portion at one end and attachable to a payload at the other end; and
   b. a control means common to the canopy of each said parachute for releasably connecting each said parachute to each other parachute, wherein said control means comprises;
      (i) a common member disposed between and intermediate each said skirt portion of said parachute cluster,
      (ii) a plurality of control lines that are attached to said common member at points of attachment that are substantially equidistant from each other on said common member, each of said control lines being threaded through a plurality of said reefing rings on confronting skirt portions of each of two adjacent parachutes, each of said control lines extending along a substantial portion of the periphery of each of said confronting portions of said adjacent parachutes not above about 50 percent of the said periphery, and
      (iii) at least one control member that is breakable under tension forces generated at the skirt portion during canopy opening, and that is attached to each of said control lines at a point remote from said common member, each said control member being threaded through at least one reefing ring on each of two adjacent parachutes.

2. A parachute assembly for controlled airdrop of a payload as in claim 1 wherein said common member is a ring with a diameter larger than the diameter of each of said reefing rings.

3. A parachute assembly for controlled airdrop of a payload as in claim 1 wherein each said control member is a tie line with its ends tied together, each said tie line being designed to break relatively simultaneously with all other tie lines.

4. A parachute assembly for controlled airdrop of a payload as in claim 1 wherein said common member is permanently connectable to a canopy skirt portion so as to prevent its loss during deployment of said parachute assembly.

5. A parachute assembly for controlled airdrop of a payload as in claim 1 wherein said cluster comprises three parachutes that are releasably connected to each other, said control means comprising:
   (i) a common member disposed between and intermediate the three parachutes;
   (ii) three control lines that are attached at points of attachment that are equidistant from each other on said common member, and (iii) at least one control loop that is attached to each of said control lines at a point remote from said common member, wherein a first of said control lines is threaded through a plurality of reefing rings that are attached to a first canopy and is threaded through a plurality of reefing rings that are attached to a second canopy, a second of said control lines is threaded through a plurality of reefing rings that are attached to said second canopy and is threaded through a plurality of reefing rings that are attached to a third canopy, and a third of said control lines is threaded through a plurality of reefing rings that are attached to said first canopy and is threaded through a plurality of reefing rings that are attached to said third canopy.

6. A parachute assembly for controlled airdrop of a payload, as in claim 5 wherein a first control loop that is attached to said first control line is threaded through at least one reefing ring on said first canopy and is threaded through at least one reefing ring on said second canopy, a second control loop that is attached to said second control line is threaded through at least one reefing ring on said second canopy and is threaded through at least one reefing ring on said third canopy, and a third control loop that is attached to said third control line and is threaded through at least one reefing ring on said first canopy and is threaded through at least one reefing ring on said third canopy.

7. A parachute assembly for controlled airdrop of a payload, as in claim 1 wherein said cluster comprises two parachutes that are releasably connected to each other, said control means comprising:

(i) a common member disposed between and intermediate the two parachutes;
(ii) two control lines attached at points of attachment that are equidistant from each other on said common member, and
(iii) at least one control loop that is attached to each of said control lines at a point remote from said common member, wherein a first of said control lines is threaded through a plurality of reefing rings that are attached to a first canopy and is threaded through a plurality of reefing rings that are attached to a second canopy and a second of said control lines is threaded through a plurality of reefing rings that are attached to said first canopy and is threaded through a plurality of reefing rings that are attached to said second canopy.

8. A parachute assembly for controlled dropping of a payload, as in claim 7 wherein a first control loop that is attached to said first control line and is threaded through at least one reefing ring on said first canopy and is threaded through at least one reefing ring on said second canopy and a second control loop that is attached to said second control line and is threaded through at least one reefing ring on said first canopy and is threaded through at least one reefing ring on said second canopy.

* * * * *